United States Patent [19]

Mueller

[11] Patent Number: 5,988,727
[45] Date of Patent: Nov. 23, 1999

[54] MOTORCYCLE FORK CLAMP

[76] Inventor: Allen B. Mueller, 1078 N. Orchard Cir., Collierville, Tenn. 38017

[21] Appl. No.: 09/135,320

[22] Filed: Aug. 7, 1998

Related U.S. Application Data

[60] Provisional application No. 60/055,151, Aug. 8, 1997.
[51] Int. Cl.$^6$ .................................................. B62J 17/04
[52] U.S. Cl. .................. 296/78.1; 248/230.1; 248/230.5; 224/448
[58] Field of Search .......................... 296/78.1; 248/74.4, 248/219.4, 229.14, 229.24, 228.5, 230.5, 231.21, 231.61, 316.6, 230.1; 224/413, 425, 448

[56] References Cited

U.S. PATENT DOCUMENTS

| | | | |
|---|---|---|---|
| 2,069,163 | 1/1937 | Hibner, Jr. | 248/74.4 |
| 5,497,973 | 3/1996 | Balzen et al. | 248/230.5 |

FOREIGN PATENT DOCUMENTS

| | | | |
|---|---|---|---|
| 1562272 | 4/1969 | France | 248/74.4 |

*Primary Examiner*—Dennis H. Pedder
*Attorney, Agent, or Firm*—Garvey, Smith, Nehrbass & Doody, L.L.C.

[57] ABSTRACT

An incrementally adjustable/integral mounting clamp having two semi-cylindrical strap sections with a mounting boss on at least one of the straps, and having a hook and spline adjustment on one set of cooperating ends of the straps and tabs on the other ends of the straps for drawing the ends together by an alien bolt. The straps are preferably formed of extruded aluminum, and providing a low-profile clamp enabling it to be attached on the fork tube in areas of little clearance.

20 Claims, 2 Drawing Sheets

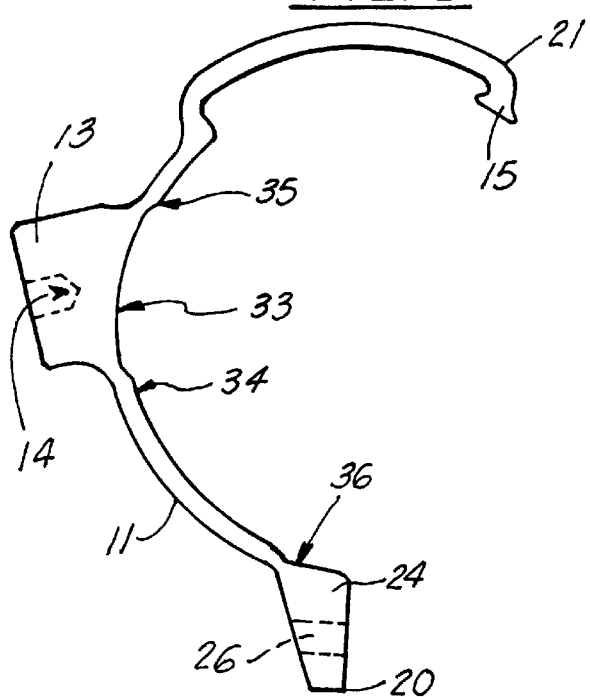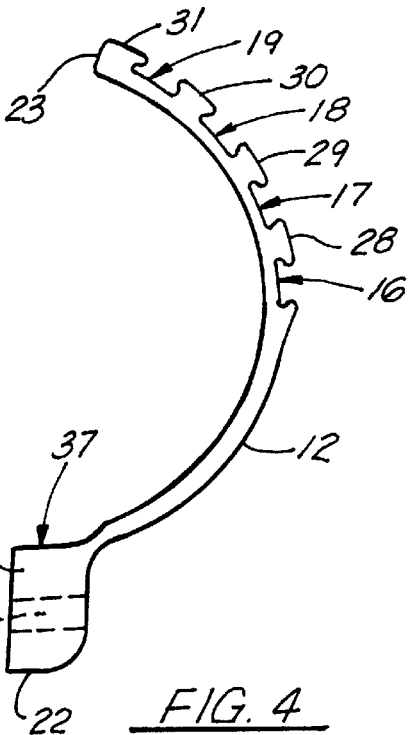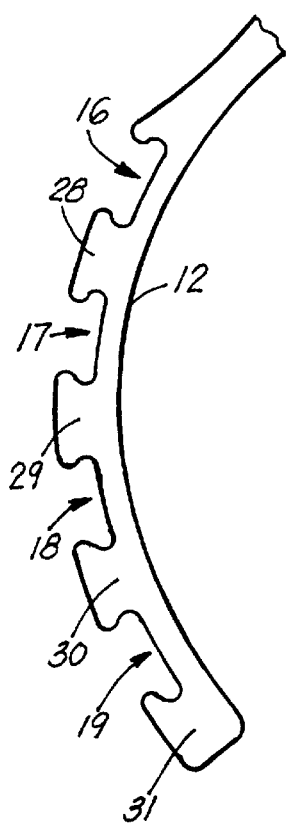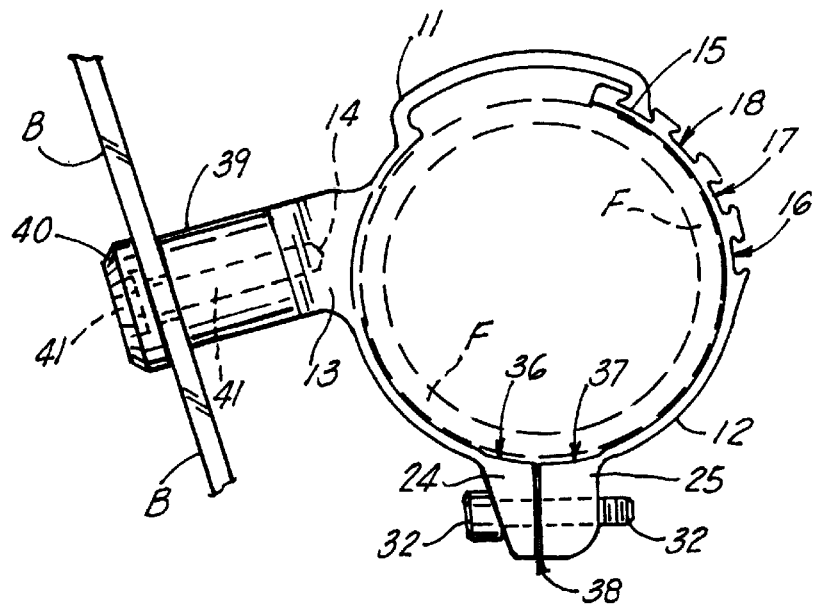

5,988,727

MOTORCYCLE FORK CLAMP

CROSS-REFERENCE TO RELATED APPLICATIONS

This application claims priority of Provisional Application Ser. No. 60/055,151 filed Aug. 8, 1997.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The invention relates to a clamp used in the mounting of motorcycle windshields and other accessories, which are mounted on tubular frame members of the motorcycle frame. Alternatively, the clamping member may be used on other sports vehicles having tubular frames upon which accessories may be mounted.

In the United States, today's motorcycle industry is fueled and driven by enthusiasts who consider riding motorcycles a sport and accessorizing and personalizing them as an avocation. The motorcycle accessory aftermarket is a multibillion-dollar industry.

A popular motorcycle accessory category is the windscreen or windshield. Most motorcycles are offered for sale without windshields. Windshield buying decisions are made by motorcycle owners, based primarily on aesthetics, function, ease of installation, perceived value and availability. Accordingly, motorcycle windshields as with other accessories vary widely in configuration.

2. General Background of the Invention

Most windshields are attached to the fork tubes of the motorcycle. The fork tubes suspend the front wheel and are the main structural members of the front end. Attachment to tubular structures is normally done by means of a clamp, and a wide variety are currently available in the market. The problem in fitting a variety of motorcycles is that there is no uniformity among, or for that matter with any particular, manufacturers as to the diameter of the fork tubes. Fork tubes typically vary from about 35 mm diameter to about 43 mm diameter. The difference in circumference is in this range amounts to over 25 millimeters (mm) or about one inch.

Prior solutions consisted of individually size-specific fork tube clamps, which were production headaches for manufacturers and stocking headaches for distributors and dealers due to the wide variety of sizes that are necessarily stocked to accommodate different motorcycles. Alternatively, a variation of the automotive worm-gear type "hose" clamps were tried, however they are now generally rejected by consumers as a viable alternative. The motorcycle enthusiast prefers a clamping mechanism which contributes, or at least does not detract from, the overall appearance of the vehicle.

The present invention provides and improved motorcycle windscreen apparatus for attachment to a motorcycle having a pair of front forks. The apparatus includes a windscreen and a pair of clamps for fixing the windscreen to the motorcycle at the front forks.

Each of the clamps includes a pair of connectable clamp sections that can affix to motorcycle forks of differing diameter in an adjustable fashion.

The connectable clamp sections each have inner curved surfaces that generally conform to the forks of the motorcycle and outer surfaces opposite the inner curved surfaces.

One of the clamped sections has a first end portion with a plurality of circumferentially spaced dove-tail sockets. The other of the clamp sections has a first end portion with a dove tail projecting portion that fits a selected one of the dove-tail shaped sockets. This enables an adjustable connection to be formed between a selected socket and the dove-tail projecting portion. Once the projected portion fits a selected socket, the clamp fits a selected fork diameter.

A bolted connection can be used for holding the clamps together at second end portions of the clamp sections spaced from the dove-tail connecting portions.

The present invention also provides an improved clamp apparatus for affixation to a tubular member. The apparatus includes clamp members each having inner curved surfaces that conform generally to the shape of the tubular member.

Each of the clamp members have end portions with connecting end portions that enable the clamp ends to be connected so that the clamp extends around the tubular member upon assembly.

The end portions of the clamps provide dove-tail connecting portions that include a plurality of dove-tail slots on one clamp member and a dove-tail projecting portion on the other clamp member. When the projecting portion selectively fits a slot to fit the clamp to the tubular members, a bolted connection or like fastener can be used to complete the connection.

BRIEF SUMMARY OF THE INVENTION

The present invention provides an incrementally adjustable/integral mounting clamp that has two clamp sections, one having with a mounting boss. The clamp sections are preferably formed of extruded aluminum, and providing a low-profile clamp enabling it to be attached on the fork tube in areas of little clearance.

The clamp of the present invention may be snapped onto any odd-size motorcycle fork tube (e.g. between about 35 mm–43 mm) quickly and easily by the installer (dealer or consumer) and may be secured by tightening a single allen bolt, bolted connection or similar fastener.

The clamp of the present invention is functional, being sturdy, rigid, and an accessory capable of being mounted by a bolt or other threaded fastener may be securely retained on the mounting boss.

The accessory clamp is stylish, aesthetically appealing, and will not mar motorcycle fork surfaces in the preferred embodiment since is manufactured of extruded aluminum, and the metal is softer than the chrome plated surface of most motorcycle fork tubes. Being of extruded aluminum, it is easy and economical to produce in large quantities and it does not require out-sourced, secondary finishing such as plating or painting.

The preferred embodiment of the invention includes two generally semi-circular clamp sections, connectable at one of their ends by cooperating dove tail splines (which are interlocking in the preferred embodiment), and securable at their other ends at facing bosses by a bolted connection or threaded fastener such as an allen bolt that is inserted through a cooperating hole in one clamp end and threaded into a tapped hole in the cooperating boss.

One of the strap sections includes a built-up mounting boss upon which an accessory such as a motorcycle windshield may be mounted. Preferably, the boss exhibits a tapped or internally threaded hole for receiving a threaded fastener such as an allen bolt for the expedient attaching of the accessory.

Various patents have issued for clamps and clamping arrangements. Further, different patents have issued for motorcycle windshield devices and methods of mounting those devices.

An example of an early hose clamp patent is seen in U.S. Pat. No. 8,750,019 issued to Wahlert and entitled "Hose Clamp". Other clamps are shown in U.S. Pat. No. 1,769,895, entitled "Hose Clamp"; U.S. Pat. No. 3,132,402, entitle "Two Piece Clamp"; and U.S. Pat. No. 4,373,235, entitled "Pipe Clamp".

Patents disclosing windshields for motorcycles and winfshield attachments include U.S. Pat. No. 4,082,345, entitled "Motorcycle Windshield Assembly"; U.S. Pat. No. 4,226,463, entitled "Windshield Mounting Assembly"; U.S. Pat. No. 4,489,973, entitled "Mounting Systems for Motorcycle Windshields"; U.S. Pat. No. 5,658,035, entitled "Quick Detachable Motorcycle Windshield"; and U.S. Pat. No. 5,732,965, entitled "Mounting System for Motorcycle Accessories".

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a partial of the preferred embodiment of the apparatus of the present invention showing one of the clamp sections;

FIG. 4 is a top view similar to FIG. 3 however, illustrating another, cooperating clamp section;

FIG. 5 is a partial top view of the preferred embodiment of the apparatus of the present invention; and FIG. 6 is a top view of the preferred embodiment of the apparatus of the present invention shown mounted to a motorcycle fork tube.

DETAILED DESCRIPTION OF THE INVENTION

Figure 1:
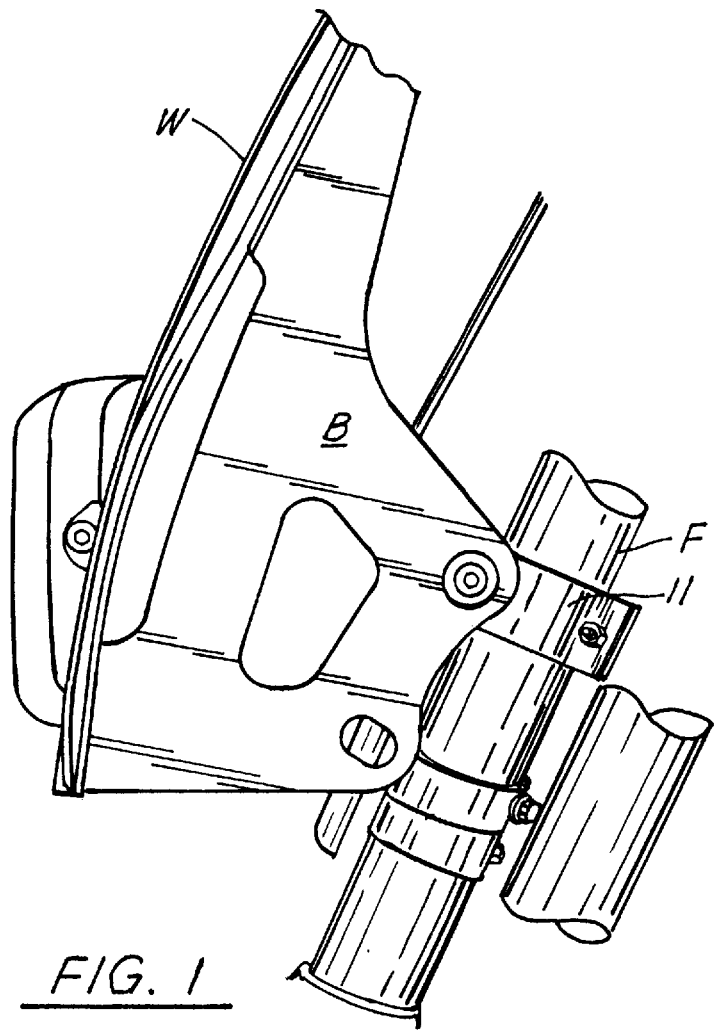
FIG. 1 is a side, elevational view of the preferred embodiment of the apparatus of the present invention showing the motorcycle windshield and windshield mounting apparatus.
Figure 2:
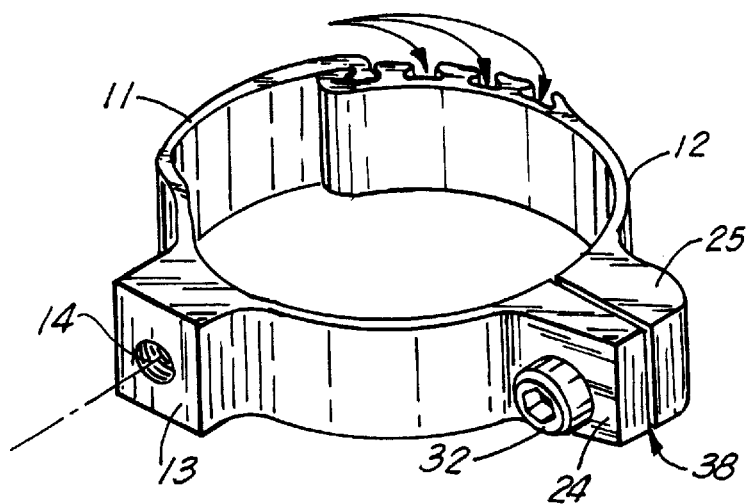
FIG. 2 is a perspective view of the preferred embodiment of the apparatus of the present invention.

Referring now to the figures in general and FIGS. 1–6, in particular, the apparatus 10 may be seen as a windshield and windscreen mounting apparatus with an incrementally adjustable, generally cylindrical round clamp comprised of a first curved clamp section 11 and a second curved clamp section 12. Disposed on clamp section 11 is an integral mounting boss 13. When clamp sections 11, 12 are assembled as illustrated in FIGS. 1, 2 and 6, around a motorcycle fork F, mounting boss 13 with threaded opening 14 that enables the bolting of windscreen support brackets B (one bracket B attaches to each fork F) and windscreen W to fork F (or like tubular structures) of varying diameters.

In FIGS. 2–6 the clamp 10 of the present invention is comprised of preferably of two clamp sections 11, 12 formed of extruded aluminum that hook together by an adjustable means as dove-tail hook 15 and cooperating dove-tail grooves 16–19 to form an overall cylindrical shape. Each clamp section 11, 12 has end portions. The clamp section 11 has end portions 20, 21. The clamp section 12 has end portions 22, 23. At respective end portions 20, 22 there are provided corresponding tabs 24, 25 with openings therethrough. Tab 24 has opening 26. Tab 25 has opening 27.

Upon assembly, the openings 26, 27 align so that a bolted connection, threaded fastener or the like can secure the tabs 24, 25 together as seen in FIGS. 2–6. Clamp section 12 encompasses a generally semi-cylindrical shape, having a series of evenly spaced dove tail splines 28–31 disposed in uniform, parallel relation at end 23. Protruding tab 25 assumes an adjacent relationship with tab 24 of clamp section 11 when in assembled relation. Threaded fastener 32 secures the adjacent tabs 24, 25 and applies tension throughout the assembled clamp 10 so as to provide a fixed relationship on the fork F or like tubular member upon which clamp 10 is mounted.

Clamp section 11 is formed to a generally semi-cylindrical shape having a mating dove tail hook 15 which locks into a selected dove-tail groove 16–19 between any two the dove tail splines 28–32 disposed on strap section 12 (see FIGS. 2 and 6). Clamp section 11 includes integral mounting boss 13 which can be drilled and tapped to include hole 14 for the purpose of receiving a threaded fastener by which accessories such as windscreen support bracket B may be secured in fixed relation on the mounting boss 13 (see FIGS. 1 and 6). In FIGS. 1 and 6, windscreen W is affixed (or integrally connected thereto) to motorcycle windscreen mounting bracket B. The bracket B is fastened to internally threaded opening 14 of boss 13. A bushing 39 and washer 40 is configuration with threaded fastener (e.g. bolt, screw, allen screw, etc.) can be used to fasten bracket B to boss 13 at opening 11.

In the illustrated preferred embodiment, clamp sections 11, 12 include regions wherein the internal surface of the sections 11, 12 which otherwise are adjacent and in contact with such as the fork tube F of the motorcycle, are relieved. As illustrated in FIGS. 3, 4 and 6, the area 33 of strap section 11 underlying mounting boss 13 is under-cut to form a relief area 33 whereby the adjacent surfaces 34 and 35 are drawn securely against the outer surface of the fork tube member F onto which clamp 10 is mounted.

In such manner and with such relief area 33, mounting boss 13 is securely retained against the tubular fork member F along the lines formed at the juncture of surfaces 34, 35 and relief area 33. The effect created is that mounting boss 13 is fixedly secured against the tubular fork member F, particularly against any pivoting or rocking motion thereby providing a much more secure mounting of the accessory on the tubular member.

In a similar manner to relief area 33, relief areas 36 and 37 are formed respectively in the clamp sections 11, 12 at tabs 24, 25 in the inner surfaces of clamps 11, 12 that otherwise would rest adjacent the surface of the tubular fork member F upon which clamp 10 is mounted. The purpose of relief areas 36 and 37 is similar to that of relief area 33 in that the clamping action provided by bolting tabs 24, 25 together is enhanced since tabs 24, 25 are not impeded by the tubular member as they are drawn together by the drawing action provided by threaded fastener 32 traversing tab 24 though hole 26 and being threaded into internally threaded or tapped hole 27 in tab 25.

The adjustability provided by dove tail hook 15 which may be selectively inserted into any of slots or grooves 16–19 intermediate complementary shaped dovetail splines 28–31 coupled with the resilience and malleability of the extruded aluminum clamp sections 11, 12, coupled with strategically placed relief areas 33, 36, 37 allows the clamp 10 to conform easily to any size tube within the grip range of the clamp 10. FIG. 5 illustrates the preferred dove tail splines 28–32 and similarly shaped grooves or slots 16–19.

FIGS. 2 and 6 illustrate the interaction of strap sections 11, 12 in assembled relation showing a space 38 intermediate tabs 24, 25 prior to securing clamp 10 to the tubular fork member F. As will be recognized by those skilled in the art, selection of a particular groove 16–19 is determined by preserving sufficient space between tabs 24, 25 during assembly so as to allow for the requisite tension to be developed throughout the cylindrical shape of clamp 10 such that it is fixedly retained on the tubular fork member F to which it is attached. The inclusion of relief areas 36 and 37 enhance the tension creating capacity of tabs 24, 25 during application of clamp 10 to the tubular fork member F.

FIG. 2 illustrates the cylindrical shape formed by the assembled strap sections 11, 12. FIG. 6 illustrates clamp in assembled relation on a fork tube F of a motorcycle. The following table lists the parts numbers and parts descriptions as used herein and in the drawings attached hereto.

PARTS LIST
Part Number Description
10 clamp apparatus
11 clamp section
12 clamp section
13 boss
14 internally threaded opening
15 dove tail hook
16 dove tail hook
17 dove tail hook
18 dove tail hook
19 dove tail hook
20 end portion
21 end portion
22 end portion
23 end portion
24 tab
25 tab
26 opening
27 opening
28 dove tail spline
29 dove tail spline
30 dove tail spline
31 dove tail spline
32 threaded fastener
33 threaded fastener
34 surface
35 surface
36 relief area
37 relief area
38 space
39 bushing
40 washer
41 screw
B bracket
F fork tube
M motorcycle The foregoing embodiments are presented by way of example only; the scope of the present invention is to be limited only by the following claims.

I claim:

1. A motorcycle windscreen apparatus for attachment to a motorcycle having a pair of front forks, comprising:

a) a windscreen;

b) a pair of clamps for affixing the windscreen to the motorcycle at its front forks;

c) each of said clamps including a pair of connectable clamp sections that can affix to forks of differing diameter;

d) said connectable clamp sections each having inner curved surfaces that surround the forks of the motorcycle, and outer surfaces;

e) one of said clamp sections having a first end portion with a plurality of circumferentially spaced dove-tail sockets, the other of said clamp sections having a first end portion with a dove-tail projecting portion that fits a selected of said sockets, wherein when said projecting portion fits a selected socket, the clamp fits a selected fork diameter;

f) a bolted connection for holding said clamp sections together at second end portions of said clamp sections.

2. The motorcycle windscreen apparatus of claim 1 wherein the clamp sections each have an outer surface spaced radially from an inner surface and one of the clamp sections provide a boss for receiving and supporting said windscreen.

3. The motorcycle windscreen apparatus of claim 1 wherein one clamp section is longer than the other clamp section.

4. The motorcycle windscreen apparatus of claim 1 wherein each of said sockets is in the form of a slot that extends generally parallel to the adjacent motorcycle during use.

5. The motorcycle windscreen apparatus of claim 4 wherein the boss has an opening that is interntally threaded to receive a threaded fastener.

6. The motorcycle windscreen apparatus of claim 1 wherein the sockets are on the outer surface of one of the clamp sections, and extend between upper and lower surfaces of the clamp section.

7. The motorcycle windscreen apparatus of claim 1 wherein there are opposed upper and lower surfaces of the clamp sections, and the sockets are in the form of slots that communicate with one of said upper and lower surfaces.

8. The motorcycle windscreen apparatus of claim 1 wherein each of said inner surfaces has cutout relief portions that do not contact the motorcycle fork during use.

9. The motorcycle windscreen apparatus of claim 1 wherein the clamp sections have outer surfaces and the dove-tail sockets are on the outer surface of one of the clamp sections.

10. A clamp apparatus for affixation to a tubular member, comprising a) a first clamp member having an inner curved surface that is configured to partially surround the tubular member;

b) a second clamp member having an inner curved surface that is configured to partially surround the tubular member;

c) each of the clamp members having end portions with connecting end portions that enable the clamp ends to be connected so that the clamp extends around the tubular member upon assembly;

d) the end portions of the clamps providing a dove tail connection that includes a plurality of dovetail slots on one clamp member and a dovetail projecting portion on the other clamp member;

e) wherein the dove-tail projecting portion selectively fits a slot, enable the clamp to fit tubular members of differing diameters.

11. The clamp apparatus of claim 10 further comprising a bolted connection opposite said dovetail connection.

12. The clamp apparatus of claim 10 wherein each clamp member has an outer surface spaced radially away from said inner curved surfaces, and said dovetail connection is positioned at said outer surfaces.

13. The clamp apparatus of claim 10 wherein each clamp member is a generally rigid structure.

14. The clamp apparatus of claim 10 wherein the slots are generally parallel.

15. The clamp apparatus of claim 10 wherein each clamp member has opposed upper and lower surfaces.

16. The clamp apparatus of claim 15 wherein the upper and lower surfaces are generally parallel.

17. The clamp apparatus of claim 10 wherein the slots communicate with one of the upper and lower surfaces.

18. The clamp apparatus of claim 10 wherein the slots communicate with both of the upper and lower surfaces.

19. A clamp apparatus for affixation to a tubular member, comprising
   a) a first clamp member having an inner surface that is configured to partially surround the tubular member;
   b) a second clamp member having an inner surface that is configured to partially surround the tubular member;
   c) each of the clamp members having end portions with connecting portions that enable the clamp ends to be connected so that the clamp members extend around the tubular member upon assembly;
   d) the connecting portions of the clamps providing a dove tail connection that includes a plurality of dovetail slots on one clamp member and a dovetail projecting portion on the other clamp member;
   e) wherein the projecting portion selectively fits a slot to fit the clamp to tubular members of differing diameters.

20. A clamp apparatus for securing accessories to a tubular member comprising:
   (a) a first generally semi-cylindrically shaped clamp section having a first end portion upon which is disposed hook means and having a second end portion upon which is disposed a first tab means;
   (b) a second generally semi-cylindrically shaped clamp section having a first end portion upon which is disposed a plurality of parallel spline means having disposed therebetween a plurality of groove means, said groove means sized and complementary shaped so as to receive said hook means securely therein, and said second strap having a second end portion upon which is disposed a second tab means;
   (c) said first and second tab means disposed on their respective clamp sections generally opposite said hook means and groove means so as to be positioned in adjacent relationship when said clamp apparatus is assembled on the tubular member;
   (d) said tab means being so configured that they can be drawn together; and
   (e) fastening means cooperating with said tab means to generate tension throughout said clamp apparatus to fixedly retain it on the tubular member.

* * * * *